US011911782B2

(12) United States Patent
Hsu et al.

(10) Patent No.: US 11,911,782 B2
(45) Date of Patent: Feb. 27, 2024

(54) NOZZLE FLOW STIRRING PIPE

(71) Applicant: ASIA IC MIC-PROCESS, INC., Taipei (TW)

(72) Inventors: Hung-Hsin Hsu, Taipei (TW); Yan-Lan Chiou, Taipei (TW)

(73) Assignee: ASIA IC MIC-PROCESS, INC., Taipei (TW)

( * ) Notice: Subject to any disclaimer, the term of this patent is extended or adjusted under 35 U.S.C. 154(b) by 416 days.

(21) Appl. No.: 17/475,357

(22) Filed: Sep. 15, 2021

(65) Prior Publication Data

US 2022/0097092 A1 Mar. 31, 2022

(30) Foreign Application Priority Data

Sep. 29, 2020 (TW) ................................ 109133914

(51) Int. Cl.

*B05B 15/20* (2018.01)
*B05B 1/14* (2006.01)
*B01F 25/421* (2022.01)
*B01F 101/58* (2022.01)

(52) U.S. Cl.

CPC ............ *B05B 15/20* (2018.02); *B01F 25/423* (2022.01); *B05B 1/14* (2013.01); *B01F 2101/58* (2022.01)

(58) Field of Classification Search

CPC ......... B05B 15/20; B05B 1/14; B01F 25/423; B01F 2101/58
USPC ........ 239/119, 124–127, 142, 289, 423, 424, 239/589; 366/165.1–165.5, 182.4; 134/103.1, 108, 111
See application file for complete search history.

(56) References Cited

U.S. PATENT DOCUMENTS 4,660,988 A * 4/1987 Hara ..................... B29B 7/7404 366/165.4
5,695,721 A * 12/1997 Kitagawa .......... B01F 27/92112 422/549
6,460,830 B1 * 10/2002 Boulant ................ B01F 23/231 261/36.1
2015/0124555 A1 * 5/2015 Fujiyama ................ B01F 33/45 366/182.4

* cited by examiner

*Primary Examiner* — Steven J Ganey

(57) ABSTRACT

A nozzle flow stirring pipe includes a pipe body and a nozzle. The pipe body is cylindrical and includes an inner pipe member and an outer pipe member. The inner pipe member has a liquid-extracting channel. The outer pipe member fits around the inner pipe member. A reflow channel is defined between an inner wall of the outer pipe member and an outer wall of the inner pipe member. The nozzle is disposed at one end of the pipe body. The inner pipe member is penetratingly disposed at the nozzle and exposed from below. The nozzle has a plurality of liquid-ejecting pores in communication with one end of the reflow channel.

10 Claims, 5 Drawing Sheets

NOZZLE FLOW STIRRING PIPE

CROSS-REFERENCE TO RELATED APPLICATION

This non-provisional application claims priority under 35 U.S.C. § 119(a) on Patent Application No(s). 109133914 filed in Taiwan, R.O.C. on Sep. 29, 2020, the entire contents of which are hereby incorporated by reference.

BACKGROUND OF THE INVENTION

1. Field of the Invention

The present disclosure relates to stirring devices, and in particular to a nozzle flow stirring pipe for use with chemical barrels.

2. Description of the Related Art

In industrial fields, such as semiconductor manufacturing and photoelectronic manufacturing, chemical solutions (including grinding solutions) are stored in chemical solution barrels. If the chemical solutions stored in the chemical solution barrels contain particles, are of high volume, or are predisposed to sedimentation, the chemical solutions must be continuously stirred to avoid sedimentation. In this regard, prior art involves mounting stirring devices on the chemical solution barrels and stirring the chemical solutions with external power, albeit ineffectively.

BRIEF SUMMARY OF THE INVENTION

An objective of the present disclosure is to provide a nozzle flow stirring pipe with a view to addressing various issues confronting conventional stirring devices.

To achieve at least the above objective, the present disclosure provides a nozzle flow stirring pipe, comprising: a pipe body being cylindrical and comprising an inner pipe member and an outer pipe member, the inner pipe member having a liquid-extracting channel, the outer pipe member fitting around the inner pipe member, wherein a reflow channel is defined between an inner wall of the outer pipe member and an outer wall of the inner pipe member; and a nozzle disposed at an end of the pipe body and having a plurality of liquid-ejecting pores in communication with an end of the reflow channel, wherein the inner pipe member is penetratingly disposed at the nozzle.

Therefore, the nozzle flow stirring pipe and the external pump are connected to form a circulation stirring system. The inner pipe member and the outer pipe member are integrated into the pipe body to reduce the required space and enhance the ease of mounting the nozzle flow stirring pipe in the barrel and connecting the external pump to the nozzle flow stirring pipe. Owing to the nozzle and the liquid-ejecting pores, the effectiveness of stirring the liquid in the barrel is enhanced.

DETAILED DESCRIPTION OF THE INVENTION

To facilitate understanding of the object, characteristics and effects of this present disclosure, embodiments together with the attached drawings for the detailed description of the present disclosure are provided.

Figure 1:
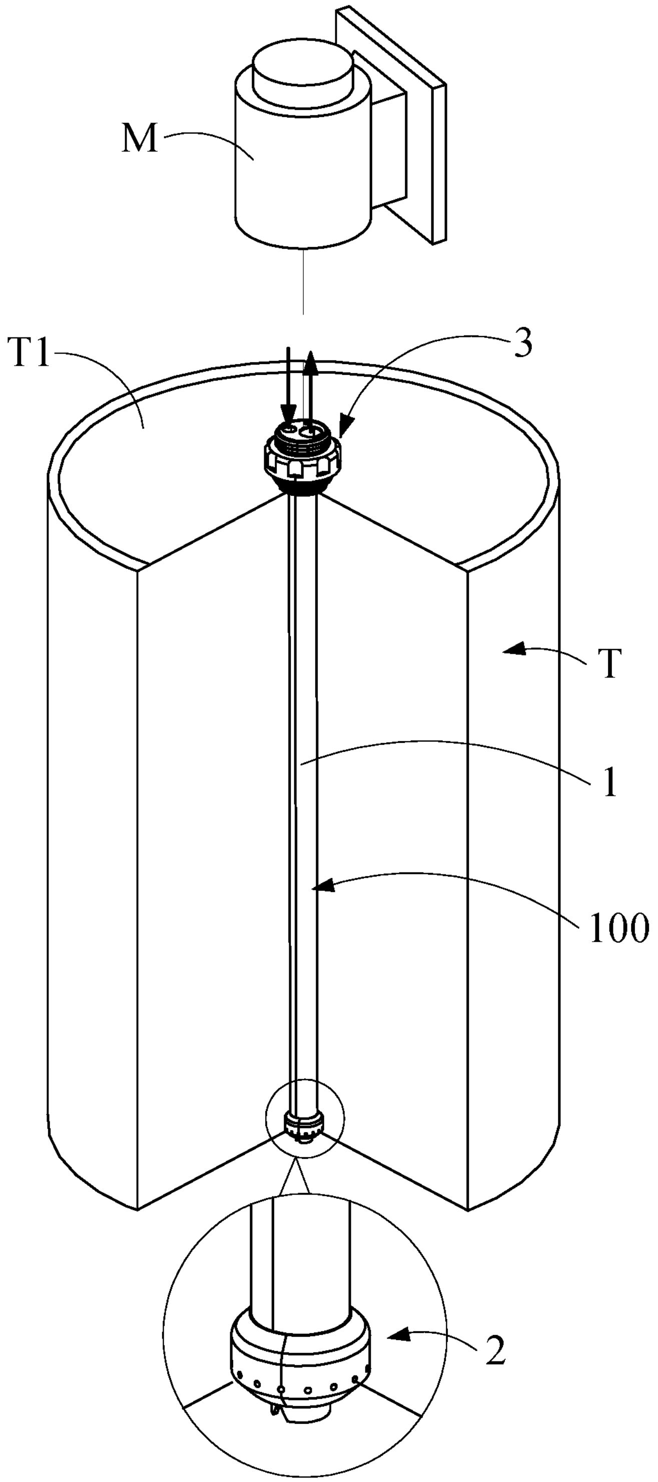
FIG. 1 is a perspective view of a nozzle flow stirring pipe according to the first embodiment of the present disclosure.

Referring to FIG. 1, a nozzle flow stirring pipe 100 in the first embodiment of the present disclosure is for use in stirring a liquid stored in a barrel T. The nozzle flow stirring pipe 100 comprises a pipe body 1 and a nozzle 2.

Figure 2:
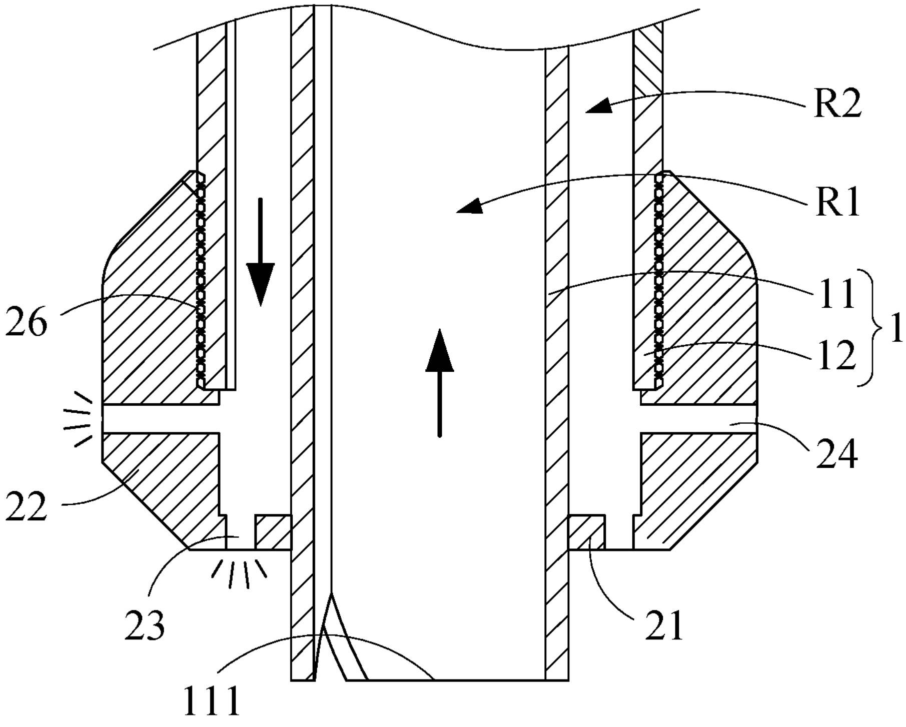
FIG. 2 is a partial cross-sectional view of the nozzle flow stirring pipe according to the first embodiment of the present disclosure.

Referring to FIG. 1 and FIG. 2, the pipe body 1 is cylindrical and comprises an inner pipe member 11 and an outer pipe member 12. The inner pipe member 11 has a liquid-extracting channel R1. The outer pipe member 12 fits around the inner pipe member 11. A reflow channel R2 is defined between the inner wall of the outer pipe member 12 and the outer wall of the inner pipe member 11.

The nozzle 2 is disposed at one end of the pipe body 1. The inner pipe member 11 is penetratingly disposed at the nozzle 2 and exposed from below. The nozzle 2 has a plurality of liquid-ejecting pores 23, 24. The liquid-ejecting pores 23, 24 are in communication with one end of the reflow channel R2.

One end of the pipe body 1 is positioned distal to the nozzle 2 and connected to an external pump M. The external pump M generates a negative-pressure suction force under which the liquid at the bottom of the barrel T is drawn into a bottom liquid-extracting hole 111 disposed at the bottom of the inner pipe member 11 (the bottom of the inner pipe member 11 is connected to the end of the nozzle 2). The liquid thus drawn is delivered upward to the external pump M via the liquid-extracting channel R1 and then reflows to the nozzle flow stirring pipe 100 via the reflow channel R2. After that, the liquid is compressed within the liquid-ejecting pores 23, 24 and ejected under a liquid reflow pressure (which equals the sum of a pressure exerted by the external pump M and an inertia pressure), thereby distributing the liquid in the barrel T. Therefore, the nozzle flow stirring pipe 100 and the external pump M are connected, thereby forming a circulation stirring system. The inner pipe member 11 and the outer pipe member 12 are integrated into the pipe body 1 to reduce the required space and enhance the ease of mounting the nozzle flow stirring pipe 100 in the barrel T and connecting the external pump M to the nozzle flow stirring pipe 100. Owing to the nozzle 2 and the liquid-ejecting pores 23, 24, the effectiveness of stirring the liquid in the barrel T is further enhanced.

Figure 3:
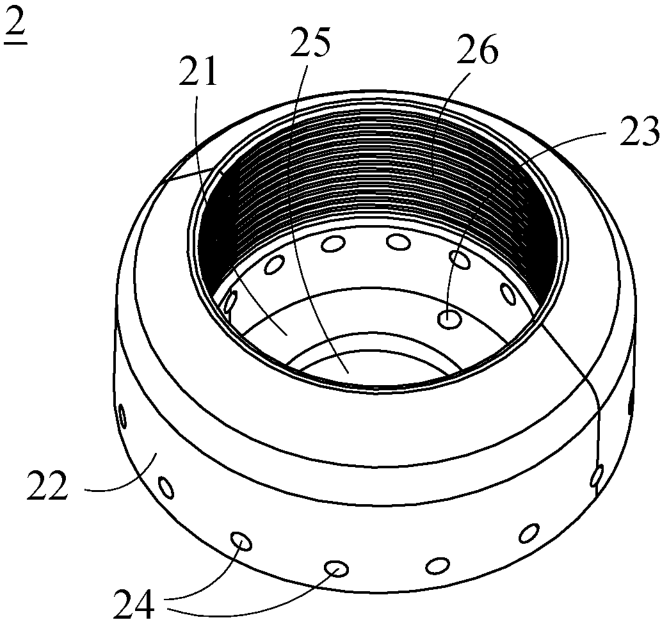
FIG. 3 is a perspective view of a nozzle according to the first embodiment of the present disclosure.

Referring to FIG. 2 and FIG. 3, in this embodiment, the nozzle 2 has a base 21 and an annular sidewall 22 surrounding the base 21. The base 21 has a penetrating hole 25. The inner pipe member 11 penetrates the penetrating hole 25 in an axial direction. The space defined between the inner pipe member 11, the annular sidewall 22 and the base 21 is in communication with the reflow channel R2. The liquid-ejecting pores 23, 24 comprise a plurality of lower liquid-ejecting pores 23 and a plurality of lateral liquid-ejecting pores 24. The lower liquid-ejecting pores 23 are disposed at the base 21. The lateral liquid-ejecting pores 24 are radially penetratingly disposed at the annular sidewall 22. The liquid is compressed in the lower liquid-ejecting pores 23 and the lateral liquid-ejecting pores 24 and ejected at all angles, thereby enhancing the effectiveness of stirring the liquid in the barrel T.

Referring to FIG. 2 and FIG. 3, in this embodiment, the lower liquid-ejecting pores 23 are higher than the bottom liquid-extracting hole 111 of the inner pipe member 11 in the axial direction to ensure that the liquid in the bottom liquid-extracting hole 111 does not interfere with the liquid in the lower liquid-ejecting pores 23 and vice versa.

Referring to FIG. 2 and FIG. 3, in this embodiment, the inward side of the annular sidewall 22 has a thread portion 26 for meshing with the outer pipe member 12, but the present disclosure is not limited thereto. The nozzle 2 and the pipe body 1 may also be coupled together in any way other than as disclosed above.

Figure 4:
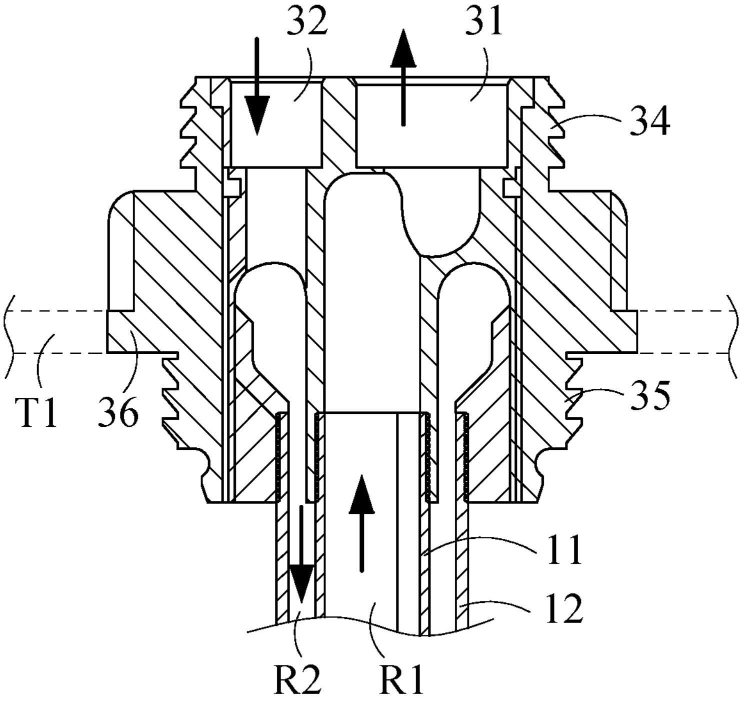
FIG. 4 is a cross-sectional view of a pump connector according to the first embodiment of the present disclosure.
Figure 5:
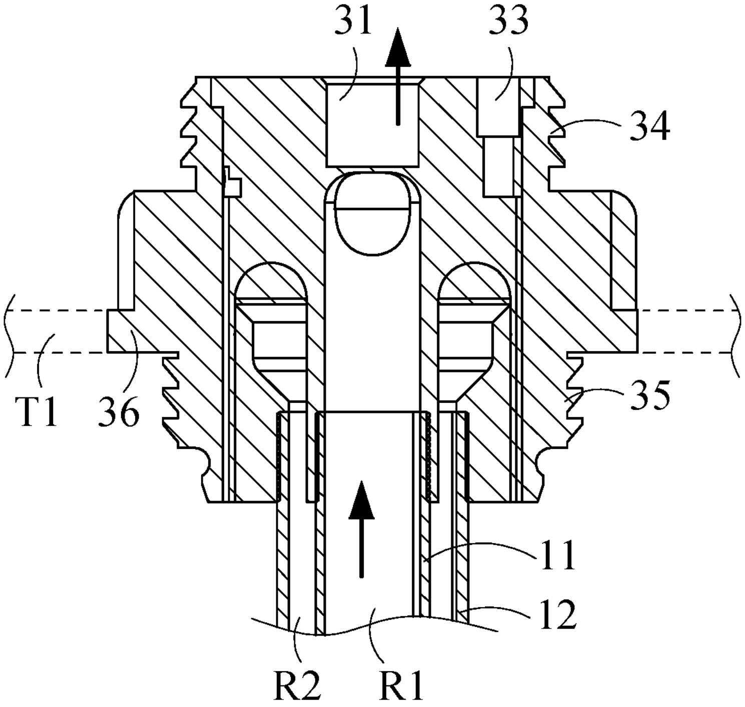
FIG. 5 is another cross-sectional view of the pump connector according to the first embodiment of the present disclosure.
Figure 6:
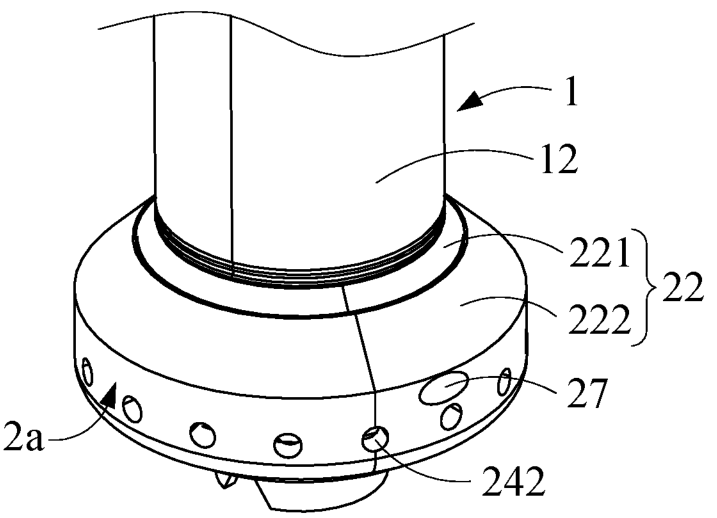
FIG. 6 is a partial perspective view of the nozzle flow stirring pipe according to the second embodiment of the present disclosure.
Figure 7:
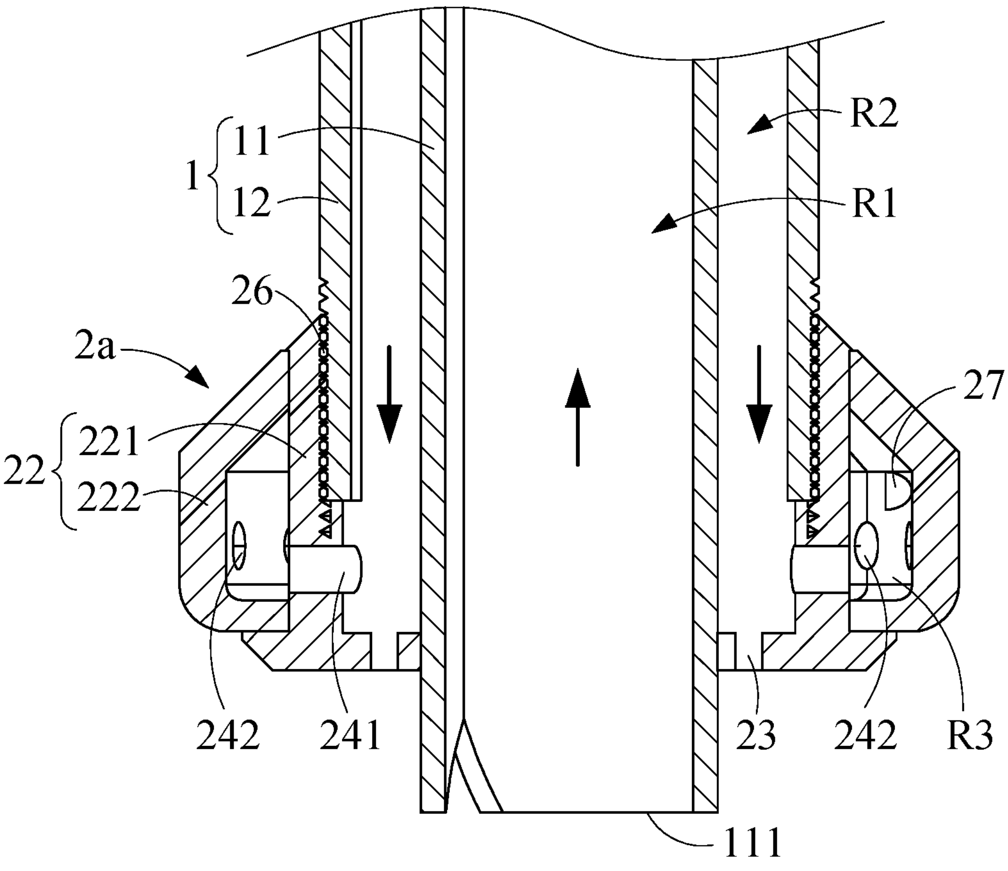
FIG. 7 is a partial cross-sectional view of the nozzle flow stirring pipe according to the second embodiment of the present disclosure.
Figure 8:
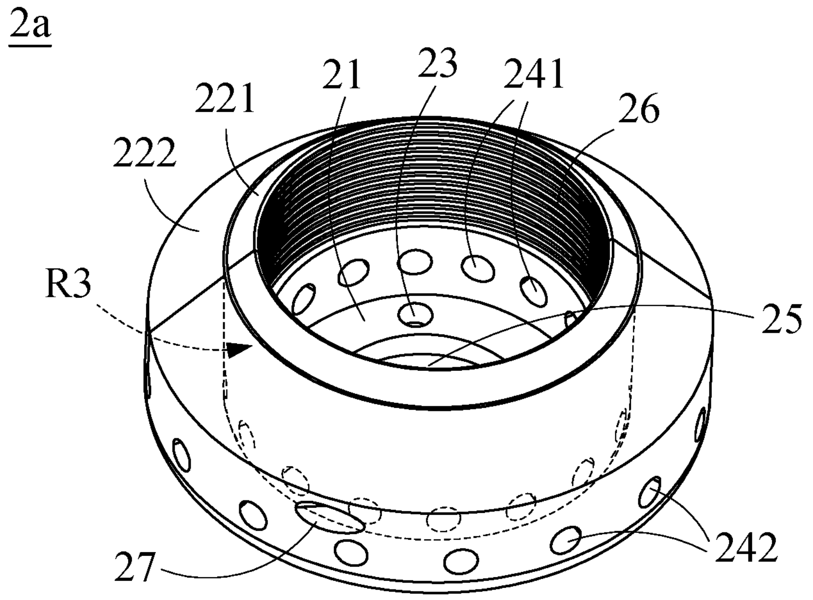
FIG. 8 is a perspective view of a nozzle according to the second embodiment of the present disclosure.
Figure 9:
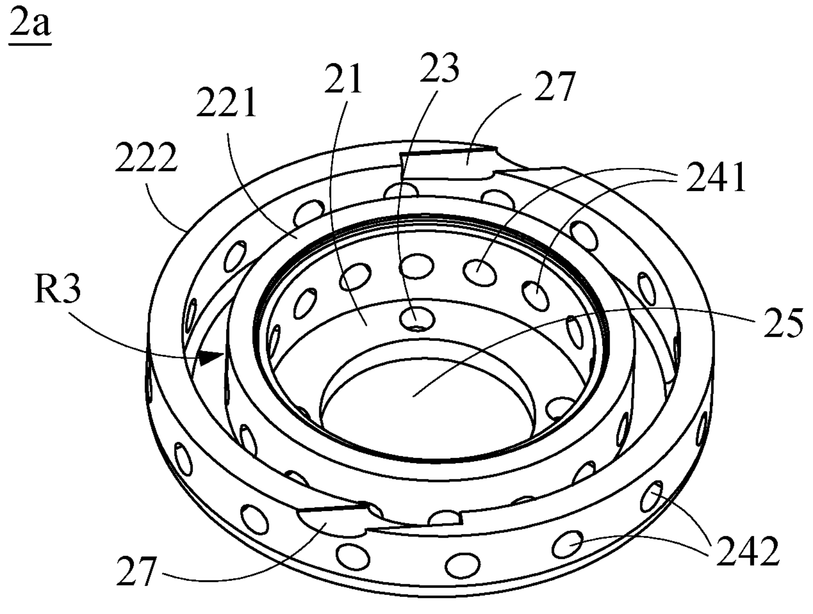
FIG. 9 is a cutaway view of the nozzle according to the second embodiment of the present disclosure.

Referring to FIG. 1, FIG. 4 and FIG. 5, in this embodiment, the nozzle flow stirring pipe 100 further comprises a pump connector 3 disposed at one end of the pipe body 1, wherein the one end of the pipe body 1 is positioned distal to the nozzle 2. The pump connector 3 has a first communication hole 31 in communication with the liquid-extracting channel R1 and an external space (or the external pump M) and has a second communication hole 32 in communication with the reflow channel R2 and an external space (or the external pump M).

Furthermore, in this embodiment, a thread 34 is disposed on a circumferential surface of an upper segment extending axially along the pump connector 3 (i.e., the upper part of the pump connector 3) and adapted to mesh with the external pump M. A thread 35 is disposed on a circumferential surface of a lower segment extending axially along the pump connector 3 (i.e., the lower part of the pump connector 3) and adapted to mesh with a cover Ti of a container (for example, the barrel T), but the abovementioned is not restrictive of how the pump connector 3 is connected to the external pump M and the barrel T according to the present disclosure. According to the present disclosure, the way the pump connector 3 is connected to the external pump M and the barrel T is adjustable in accordance with the structures of the external pump M and the barrel T.

Furthermore, in this embodiment, after the pump connector 3 has been fixed to the cover Ti by means of meshing or fastening, the pump connector 3 has a seal portion 36 which is tightly fitted to a flat surface of the cover Ti to prevent the liquid from leaking and render the liquid free from external pollution. At this point in time, the lower segment of the pump connector 3 is positioned in the barrel T, whereas the upper segment of the pump connector 3 lies outside the barrel T.

Referring to FIG. 5, in this embodiment, the pump connector 3 further has a ventilation hole 33 in communication with the lower segment of the pump connector 3. The ventilation hole 33 enables gas exchange between the barrel T and the external space, so as to maintain the equilibrium of pressure inside the barrel T.

Referring to FIG. 6 through FIG. 9, unlike the annular sidewall 22 of the nozzle 2 of the first embodiment of present disclosure, the annular sidewall 22 of the nozzle 2*a* of the second embodiment of the present disclosure further comprises an inner sidewall 221 and an outer sidewall 222. The inner sidewall 221 and the outer sidewall 222 are annular and concentric. In the second embodiment, a space is defined between the inner pipe member 11, the inner sidewall 221 and the base 21 and is in communication with one end of the reflow channel R2. Furthermore, an annular channel R3 is defined between the inner sidewall 221 and the outer sidewall 222. The inner sidewall 221 has a plurality of inward liquid-ejecting pores 241 radially penetrating the inner sidewall 221. The outer sidewall 222 has a plurality of outward liquid-ejecting pores 242 radially penetrating the outer sidewall 222. The inner sidewall 221 and the outer sidewall 222 rotate relative to each other. When the inner sidewall 221 meshes with the outer pipe member 12 by means of the thread portion 26, the outer sidewall 222 rotates relative to the inner sidewall 221 under a thrust generated by the liquid flowing through the annular channel R3 or by any other means of driving (for example, a magnet is embedded in the wall of the outer sidewall 222 and rotated by an applied magnetic field), thereby further enhancing the effectiveness of stirring.

Furthermore, in the second embodiment, the outer sidewall 222 has a plurality of rotational nozzle flow holes 27 which penetrate the outer sidewall 222 in a tangential direction of the inner sidewall 221 and thus are in communication with the annular channel R3 and the external space (in the barrel T). After being ejected in the tangential direction, the liquid inertially drives the outer sidewall 222 to rotate in the tangential direction. Therefore, the outer sidewall 222 rotates in the absence of any applied driving force, thereby enhancing the effectiveness of stirring.

While the present disclosure has been described by means of specific embodiments, numerous modifications and variations could be made thereto by those skilled in the art without departing from the scope and spirit of the present disclosure set forth in the claims.

What is claimed is:

1. A nozzle flow stirring pipe, comprising:

a pipe body being cylindrical and comprising an inner pipe member and an outer pipe member, the inner pipe member having a liquid-extracting channel, the outer pipe member fitting around the inner pipe member, wherein a reflow channel is defined between an inner wall of the outer pipe member and an outer wall of the inner pipe member; and a nozzle disposed at an end of the pipe body and having a plurality of liquid-ejecting pores in communication with an end of the reflow channel, wherein the inner pipe member is penetratingly disposed at the nozzle.

2. The nozzle flow stirring pipe of claim 1, wherein the nozzle has a base and an annular sidewall surrounding the base, the base having a penetrating hole, wherein the inner pipe member penetrates the penetrating hole in an axial direction, and a space defined between the inner pipe member, the annular sidewall and the base is in communication with the reflow channel.

3. The nozzle flow stirring pipe of claim 2, wherein the liquid-ejecting pores comprise a plurality of lower liquid-ejecting pores disposed at the base and a plurality of lateral liquid-ejecting pores disposed at the annular sidewall.

4. The nozzle flow stirring pipe of claim 3, wherein the lower liquid-ejecting pores are higher than a bottom liquid-extracting hole of the inner pipe member in the axial direction.

5. The nozzle flow stirring pipe of claim 2, wherein the annular sidewall comprises an inner sidewall and an outer sidewall which are annular and concentric, the outer sidewall rotating relative to the inner sidewall, wherein a space defined between the inner pipe member, the inner sidewall and the base is in communication with an end of the reflow channel, wherein an annular channel is defined between the outer sidewall and the inner sidewall, the inner sidewall having a plurality of inward liquid-ejecting pores radially penetrating the inner sidewall, the outer sidewall having a plurality of outward liquid-ejecting pores radially penetrating the outer sidewall.

6. The nozzle flow stirring pipe of claim 5, wherein the outer sidewall has a plurality of rotational nozzle flow holes penetrating the outer sidewall in a tangential direction of the inner sidewall and thus being in communication with the annular channel and an external space.

7. The nozzle flow stirring pipe of claim 1, further comprising a pump connector disposed at an end of the pipe body, wherein the end of the pipe body is positioned distal to the nozzle, wherein the pump connector is in communication with the liquid-extracting channel and an external space and is in communication with the reflow channel and an external space.

8. The nozzle flow stirring pipe of claim 7, wherein a thread is disposed on a circumferential surface of an upper segment extending axially along the pump connector and adapted to mesh with an external pump.

9. The nozzle flow stirring pipe of claim 7, wherein a thread is disposed on a circumferential surface of a lower segment extending axially along the pump connector and adapted to mesh with a cover of a container.

10. The nozzle flow stirring pipe of claim 7, wherein the pump connector further has a ventilation hole in communication with upper and lower segments of the pump connector.

* * * * *